(12) United States Patent
Hyogo et al.

(10) Patent No.: US 10,731,021 B2
(45) Date of Patent: Aug. 4, 2020

(54) PROCESS FOR PRODUCING HEAT-EXPANDABLE MICROSPHERES AND APPLICATION THEREOF

(71) Applicant: MATSUMOTO YUSHI-SEIYAKU CO., LTD., Yao-shi, Osaka (JP)

(72) Inventors: Norimichi Hyogo, Yao (JP); Katsushi Miki, Yao (JP); Koichi Sakabe, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 202 days.

(21) Appl. No.: 15/740,459

(22) PCT Filed: Jun. 21, 2016

(86) PCT No.: PCT/JP2016/068335
§ 371 (c)(1),
(2) Date: Dec. 28, 2017

(87) PCT Pub. No.: WO2017/002659
PCT Pub. Date: Jan. 5, 2017

(65) Prior Publication Data
US 2018/0186960 A1    Jul. 5, 2018

(30) Foreign Application Priority Data
Jun. 29, 2015   (JP) .................. 2015-129920

(51) Int. Cl.
*C08J 9/20* (2006.01)
*B01J 13/18* (2006.01)
(Continued)

(52) U.S. Cl.
CPC ............. *C08J 9/20* (2013.01); *B01J 13/14* (2013.01); *B01J 13/18* (2013.01); *C08F 2/18* (2013.01);
(Continued)

(58) Field of Classification Search
None
See application file for complete search history.

(56) References Cited

U.S. PATENT DOCUMENTS

| | | | |
|---|---|---|---|
| 3,615,972 | A | 10/1971 | Morehouse, Jr. et al. |
| 5,834,526 | A | 11/1998 | Wu et al. |

(Continued)

FOREIGN PATENT DOCUMENTS

| | | |
|---|---|---|
| CN | 1426444 A | 6/2003 |
| CN | 1514865 A | 7/2004 |

(Continued)

OTHER PUBLICATIONS

International Search Report for PCT/JP2016/068335 dated Aug. 2, 2016 [PCT/ISA/210].

(Continued)

*Primary Examiner* — Jeffrey D Washville
(74) *Attorney, Agent, or Firm* — Sughrue Mion, PLLC (57) ABSTRACT

A process for producing heat-expandable microspheres which enables constant and high-yield production of heat-expandable microspheres having a mean particle size ranging from 0.01 to 10 μm without deteriorating their expansion performance, and the application thereof. The process produces heat-expandable microspheres containing a thermoplastic resin shell and the blowing agent encapsulated therein. The process includes a step of dispersing a polymerizable component and the blowing agent in an aqueous dispersion medium containing a polyester amide having an acid value (mgKOH/g) ranging from 95 to 140 and a step of polymerizing the polymerizable component.

17 Claims, 1 Drawing Sheet

(51) Int. Cl.
*C08J 9/32* (2006.01)
*B01J 13/14* (2006.01)
*C08F 2/18* (2006.01)
*C09K 3/10* (2006.01)
*C08F 2/20* (2006.01)

(52) U.S. Cl.
CPC . *C08J 9/32* (2013.01); *C08F 2/20* (2013.01); *C08J 2203/22* (2013.01); *C09K 3/1006* (2013.01); *C09K 3/1021* (2013.01)

(56) References Cited

U.S. PATENT DOCUMENTS

| | | |
|---|---|---|
| 8,759,410 B2 | 6/2014 | Ejiri |
| 2003/0143399 A1 | 7/2003 | Satake et al. |
| 2004/0157057 A1 | 8/2004 | Tasaki et al. |
| 2005/0080151 A1 | 4/2005 | Miki et al. |
| 2009/0149559 A1 | 6/2009 | Masuda et al. |
| 2009/0292031 A1 | 11/2009 | Ejiri |
| 2014/0364521 A1 | 12/2014 | Tayagaki et al. |

FOREIGN PATENT DOCUMENTS

| | | |
|---|---|---|
| CN | 1697868 A | 11/2005 |
| CN | 101312782 A | 11/2008 |
| CN | 104053681 A | 9/2014 |
| JP | 42-026524 S | 12/1967 |
| JP | 02-214538 A | 8/1990 |
| JP | 9-019635 A | 1/1997 |
| JP | 2009-067898 A | 4/2009 |
| JP | 012167286 A1 * | 5/2012 |
| JP | 2012-167286 A | 9/2012 |
| JP | 2014-080616 A | 5/2014 |

OTHER PUBLICATIONS

Communication dated Oct. 19, 2018 issued by the Swedish Patent and Registration Office in counterpart application No. 1751658-4.
Communication dated Mar. 13, 2020, issued by the China National Intellectual Property Administration in corresponding application No. 201680035280.7.

* cited by examiner

PROCESS FOR PRODUCING HEAT-EXPANDABLE MICROSPHERES AND APPLICATION THEREOF

CROSS-REFERENCE TO RELATED APPLICATIONS

This application is a National Stage of International Application No. PCT/JP2016/068335 filed Jun. 21, 2016 which claims priority from Japanese Patent Application No. 2015-129920 filed Jun. 29, 2015, the contents of all of which are incorporated herein by reference in their entirety.

BACKGROUND OF THE INVENTION

1. Field of the Invention

The present invention relates to a process for producing heat-expandable microspheres and applications thereof.

2. Description of the Related Art

Heat-expandable microspheres comprise a thermoplastic resin shell and a blowing agent (core) encapsulated therein. PTL 1 discloses an example of a process for producing heat-expandable microspheres in which an oily mixture containing a blowing agent of a low-boiling-point aliphatic hydrocarbon, a polymerizable monomer and an oil-soluble polymerization initiator is suspended in an aqueous dispersion medium. Further, the polymerizable monomer is polymerized to produce heat-expandable microspheres containing the blowing agent encapsulated therein. In such a process for providing the heat-expandable microspheres, a polymeric dispersion stabilizer, a particulate metal compound, an anionic surfactant, a nonionic surfactant, a cationic surfactant and a amphoteric surfactant are employed as dispersion stabilizers for stabilizing the oil globules during the polymerization.

In the above-mentioned process for producing the heat-expandable microspheres, obtaining a constant and high yield of the intended heat-expandable microspheres is one of important considerations. In the production process of small-sized heat-expandable microspheres having a mean particle size ranging from 0.01 to 10 μm, the coalescence of oil globules and agglomeration of particles being polymerized sometimes result, and can lead to scum generation in the suspension so as to inhibit a constant and high-yield production of heat-expandable microspheres. In this case, a high amount of a polymeric dispersion stabilizer added to the aqueous dispersion medium is a well-known solution for achieving a constant and high-yield production of heat-expandable microspheres.

Although the above solution is effective to achieve constant and high-yield production of heat-expandable microspheres having a mean particle size ranging from 0.01 to 10 μm, the high amount of the polymeric dispersion stabilizer causes plasticization of the thermoplastic resin constituting the shell of the resultant heat-expandable microspheres and deteriorates the expansion performance of the heat-expandable microspheres.

PATENT LITERATURE

[PTL 1] Japanese Patent Examination Publication 1967-26524

SUMMARY OF THE INVENTION

It is therefore an object of the present invention to provide a process for constantly producing heat-expandable microspheres having a mean particle size ranging from 0.01 to 10 μm with high yield and without deteriorating their expansion performance, and applications thereof.

After diligent study, the present inventors found that the above problems can be solved by a process for producing heat-expandable microspheres in which the polymerizable component is polymerized in an aqueous dispersion medium containing a polyester amide having a specific acid value, to thereby achieve the present invention.

More particularly, the above object has been achieved, in accordance with a first aspect of the invention, by providing (1) a process for producing heat-expandable microspheres comprising a thermoplastic resin shell and a blowing agent encapsulated therein, the process including dispersing a polymerizable component and the blowing agent in an aqueous dispersion medium containing a polyester amide having an acid value (mgKOH/g) ranging from 95 to 140 and polymerizing the polymerizable component, wherein the heat-expandable microspheres have a mean particle size ranging from 0.01 to 10 μm.

In a preferred embodiment (2) of the process for producing heat-expandable microspheres according to (1) above, the polyester amide is obtained from reaction of a carboxylic acid having at least two carboxyl groups and an amino alcohol having at least one amino group and two hydroxyl groups.

In another preferred embodiment (3) of the process for producing heat-expandable microspheres according to (1) or (2) above, the polyester amide has an amine value (mgKOH/g) ranging from 20 to 60.

In yet another preferred embodiment (4) of the process for producing heat-expandable microspheres according to any of (1) to (3) above, the amount of the polyester amide in the aqueous dispersion medium ranges from 0.0001 to 5 parts by weight to 100 parts by weight of the total of the polymerizable component and blowing agent.

In yet another preferred embodiment (5) of the process for producing heat-expandable microspheres according to any of (1) to (4) above, the carboxylic acid having at least two carboxylic groups is adipic acid, and the amino alcohol having at least one amino group and two hydroxyl groups is diethanolamine.

In yet another preferred embodiment (6) of the process for producing heat-expandable microspheres according to any of (1) to (5) above, the aqueous dispersion medium further contains a particulate metal compound having a mean particle size ranging from 1.0 to 20 nm.

In yet another preferred embodiment (7) of the process for producing heat-expandable microspheres according to (6) above, the particulate metal compound is colloidal silica and the pH of the aqueous dispersion medium is 7 or lower.

In a second aspect (8), the present invention provides hollow particles manufactured by thermally expanding the heat-expandable microspheres produced in the process according to any of (1) to (7) above. In a preferred embodiment (9), the hollow particles (8) further contain fine particles coating an outer surface of the hollow particles.

In a third aspect (10), the present invention provides a composition containing a base component and at least one type of microspheres selected from the group consisting of the heat-expandable microspheres produced in the process for producing heat-expandable microspheres according to any of (1) to (7) above and the hollow particles according to (8) or (9) above.

In a fourth aspect (11), the present invention provides a formed product manufactured by forming the composition according to (10) above.

Advantageous Effects of Invention

The process for producing the heat-expandable micro spheres of the present invention enables constant and high-yield production of heat-expandable microspheres having a mean particle size ranging from 0.01 to 10 μm without deteriorating their expansion performance.

The hollow particles of the present invention manufactured from the heat-expandable microspheres are light-weight.

The composition of the present invention containing the heat-expandable microspheres produced in the process mentioned above and/or the hollow particles mentioned above has good material properties.

The formed product of the present invention manufactured by forming the composition mentioned above is lightweight and has good material properties.

REFERENCE SYMBOLS LIST

Reference symbols used to identify various features in the drawings include the following.
11 Thermoplastic resin shell
12 Blowing agent
1 Hollow particles (fine-particle-coated hollow particles)
2 Shell
3 Void
4 Fine particle (in a state of adhesion)
5 Fine particle (in a state of fixation in a dent)

DETAILED DESCRIPTION OF THE PREFERRED EMBODIMENTS

The invention will next be described in greater detail with reference to the drawings. However, the present invention should not be construed as being limited thereto.
Process for Producing Heat-Expandable Microspheres The process of the present invention produces heat-expandable microspheres comprising a thermoplastic resin shell and the blowing agent encapsulated therein. The process includes the step of dispersing a polymerizable component and the blowing agent in an aqueous dispersion medium containing a polyester amide having an acid value (mgKOH/g) ranging from 95 to 140 and polymerizing the polymerizable component, and produces the heat-expandable microspheres having a mean particle size ranging from 0.01 to 10 μm. The process of the present invention and the components used in the process are described as follows.
Polymerization Step In the polymerization step, an oily mixture containing the polymerizable component and blowing agent is dispersed in the aqueous dispersion medium and the polymerizable component is polymerized.

The blowing agent is not specifically restricted except that it should be a thermally vaporizable substance, and includes, for example, $C_3$-$C_{13}$ hydrocarbons such as propane, (iso)butane, (iso)pentane, (iso)hexane, (iso)heptane, (iso)octane, (iso)nonane, (iso)decane, (iso)undecane, (iso)dodecane and (iso)tridecane; hydrocarbons having a carbon number greater than 13 and not greater than 20, such as (iso)hexadecane and (iso)eicosane; hydrocarbons from petroleum fractions such as pseudocumene, petroleum ether, and normal paraffins and isoparaffins having an initial boiling point ranging from 150 to 260° C. and/or being distilled at a temperature ranging from 70 to 360° C.; halides of $C_1$-$C_{12}$ hydrocarbons, such as methyl chloride, methylene chloride, chloroform and carbon tetrachloride; fluorine-containing compounds, such as hydrofluoroether; silanes having $C_1$-$C_5$ alkyl groups, such as tetramethyl silane, trimethylethyl silane, trimethylisopropyl silane and trimethyl-n-propyl silane; and compounds which thermally decompose to generate gases, such as azodicarbonamide, N,N'-dinitrosopentamethylenetetramine and 4,4'-oxybis(benzenesulfonyl hydrazide). One of or a combination of at least two of those blowing agents can be employed. The aforementioned blowing agents can be any of linear, branched or alicyclic compounds, and should preferably be aliphatic compounds.

The blowing agent is thermally vaporizable and preferably has a boiling point not higher than the softening point of the thermoplastic resin shell. This is because such a blowing agent encapsulated in heat-expandable microspheres can generate sufficient vapor pressure at the expansion temperature of the heat-expandable microspheres to attain a high expansion ratio of the microspheres. In addition, another blowing agent having a boiling point higher than the softening point of the thermoplastic resin shell can be encapsulated along with the blowing agent having a boiling point not higher than the softening point of the thermoplastic resin shell.

The polymerizable component is polymerized in the presence of a polymerization initiator to be converted into a thermoplastic resin which constitutes the shell of the heat-expandable microspheres. The polymerizable component essentially contains a monomer component and can optionally contain a cross-linking agent.

The monomer component is not specifically restricted, and generally includes a component called a radically-polymerizable monomer having a polymerizable double bond.

The monomer component is not specifically restricted, and includes, for example, nitrile monomers such as acrylonitrile, methacrylonitrile, and fumaronitrile; carboxyl-group-containing monomers such as acrylic acid, methacrylic acid, ethacrylic acid, crotonic acid, cinnamic acid, maleic acid, itaconic acid, fumaric acid, citraconic acid, and chloromaleic acid; vinyl halide monomers, such as vinyl chloride; vinylidene halide monomers, such as vinylidene chloride; vinyl ester monomers, such as vinyl acetate, vinyl propionate and vinyl butyrate; (meth)acrylate monomers, such as methyl (meth)acrylate, ethyl (meth)acrylate, n-butyl (meth)acrylate, t-butyl (meth)acrylate, 2-ethylhexyl (meth)acrylate, stearyl (meth)acrylate, phenyl (meth)acrylate, isobornyl (meth)acrylate, cyclohexyl (meth)acrylate, benzyl (meth)acrylate, and 2-hydroxyethyl (meth)acrylate; (meth)acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and α-methyl styrene; ethylenically unsaturated monoolefin monomers, such as ethylene, propylene, and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrolidone; and vinyl naphthalene salts. The monomer component can contain one of or a combination of at least two of those radically polymerizable monomers. The term, "(meth) acryl", means acryl or methacryl.

The polymerizable component preferably contains at least one monomer component selected from the group consisting of nitrile monomers, carboxyl-group-containing monomers, (meth) acrylate monomers, styrene monomers, vinyl ester monomers, (meth) acrylamide monomers, and vinylidene halide monomers.

The polymerizable component essentially containing a nitrile monomer as the monomer component is preferable for producing heat-expandable microspheres of high expansion performance. Of those nitrile monomers, acrylonitrile (AN) and methacrylonitrile (MAN) are preferable for their availability and high expansion performance of the heat-expandable microspheres produced from the polymerizable component containing acrylonitrile (AN) and/or methacrylonitrile (MAN).

The weight ratio of acrylonitrile (AN) and methacrylonitrile (MAN) in a nitrile monomer is not specifically restricted, and preferably ranges from 10:90 to 90:10, more preferably from 20:80 to 80:20, and further more preferably from 30:70 to 80:20. The weight ratio of AN and MAN beyond the range from 10:90 to 90:10 can cause poor expansion performance of the resultant heat-expandable microspheres because of the imbalance between the gas impermeability and softness of the shell of the microspheres.

The amount of the nitrile monomers is not specifically restricted, and preferably ranges from 20 to 100 wt % of the monomer component, more preferably from 30 to 100 wt %, further more preferably from 40 to 100 wt %, yet further more preferably from 50 to 100 wt %, and most preferably from 60 to 100 wt %. The monomer component containing less than 20 wt % of nitrile monomers can cause poor expansion performance of the resultant microspheres.

The polymerizable component essentially containing a carboxyl-group-containing monomer as the monomer component will contribute to excellent expansion performance and heat resistance of the resultant heat-expandable microspheres. Acrylic acid and methacrylic acid are specifically preferable carboxyl-group-containing monomers owing to their availability and improved heat resistance of the resultant heat-expandable microspheres.

The amount of the carboxyl-group-containing monomers is not specifically restricted, and preferably ranges from 10 to 70 wt % of the monomer component, more preferably from 15 to 60 wt %, further more preferably from 20 to 50 wt %, yet further more preferably from 25 to 45 wt %, and most preferably from 30 to 40 wt %. The amount of the carboxyl-group-containing monomers less than 10 wt % may not be effective to achieve sufficient heat resistance of the resultant heat-expandable microspheres. On the other hand, the amount of the carboxyl-group-containing monomers greater than 70 wt % can cause poor gas impermeability of the resultant microspheres which deteriorates their expansion performance.

For the monomer component essentially containing a nitrile monomer and carboxyl-group-containing monomer, the total amount of the nitrile monomer and carboxyl-group-containing monomer is preferably at least 50 wt % of the monomer component, more preferably at least 60 wt %, further more preferably at least 70 wt %, yet further more preferably at least 80 wt %, and most preferably at least 90 wt %.

In this case, the amount of the carboxyl-group-containing monomer in the total amount of the nitrile monomer and carboxyl-group-containing monomer preferably ranges from 10 to 70 wt %, more preferably from 15 to 60 wt %, further more preferably from 20 to 50 wt %, yet further more preferably from 25 to 45 wt %, and most preferably from 30 to 40 wt %. The amount of the carboxyl-group-containing monomer less than 10 wt % can cause insufficiently improved heat resistance of the resultant microspheres and lead to unstable expansion performance of the resultant microspheres in a wide high temperature range over a long period of heating. On the other hand, the amount of the carboxyl-group-containing monomer greater than 70 wt % can cause poor gas impermeability of the resultant microspheres which deteriorates their expansion performance.

The polymerizable component containing vinylidene chloride monomers as the monomer component will improve the gas impermeability of the resultant microspheres. The polymerizable component containing (meth) acrylate monomers and/or styrene monomers contributes to readily controllable thermal expansion performance of the resultant heat-expandable microspheres. The polymerizable component containing (meth) acrylamide monomers contributes to improved heat resistance of the resultant heat-expandable microspheres.

The amount of the at least one monomer selected from the group consisting of vinylidene chloride, (meth) acrylate monomers, (meth) acrylamide monomers, maleimide monomers and styrene monomers is preferably less than 80 wt % of the monomer component, more preferably less than 50 wt %, and most preferably less than 30 wt %. The monomer component containing 80 wt % or more of the monomer can cause poor expansion performance of the resultant microspheres.

The polymerizable component can contain a polymerizable monomer having at least two polymerizable double bonds (a cross-linking agent) other than the monomers mentioned above. Polymerization of the monomer component with the cross-linking agent will minimize the decrease in the amount of the blowing agent retained in thermally expanded microspheres (the encapsulation efficiency of the blowing agent) and achieve efficient thermal expansion of the microspheres.

The cross-linking agent is not specifically restricted, and includes, for example, aromatic divinyl compounds, such as divinylbenzene; and di(meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,6-hexanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, PPG (400) di(meth)acrylate, PPG (700) di(meth)acrylate, trimethylolpropane trimethacrylate, EO-modified trimethylolpropane trimethacrylate, glycerin dimethacrylate, dimethylol-tricyclodecane diacrylate, pentaerythritol tri(meth)acrylate, pentaerythritol tetraacrylate, dipentaerythritol hexaacrylate, 2-butyl-2-ethyl-1,3-propanediol diacrylate, tris(2-acryloyloxyethyl) isocyanurate, triallyl isocyanurate, triallyl cyanurate, triglycidyl isocyanurate, polytetramethyleneglycol dimethacrylate, EO-modified bisphenol A dimethacrylate, neopentylglycol dimethacrylate, nonanediol diacrylate, trimethylol propane tri(meth)acrylate and 3-methyl-1,5 pentanediol diacrylate. One of or a combination of at least two of those cross-linking agents can be used.

The amount of the cross-linking agent, which is optionally used, is not specifically restricted and preferably ranges from 0.01 to 5 parts by weight to 100 parts by weight of the monomer component and more preferably from 0.1 to 1 part by weight for attaining optimum degree of cross-linking, high encapsulation efficiency of a blowing agent in the microspheres and good heat resistance and expansion performance of the resultant microspheres.

The polymerizable component is preferably polymerized in the presence of a polymerization initiator. The polymerization initiator can be contained in the oily mixture along with the polymerizable component and blowing agent.

The polymerization initiator is not specifically restricted, and includes, for example, peroxides, such as peroxydicarbonates, peroxyesters, and diacyl peroxides; and azo compounds, such as azo nitriles, azo esters, azo amides, azo alkyls and polymeric azo initiators. One of or a combination of at least two of the polymerization initiators can be employed. The polymerization initiator is preferably an oil-soluble polymerization initiator which is soluble in radically-polymerizable monomers.

The amount of the polymerization initiator is not specifically restricted, and preferably ranges from 0.1 to 8 parts by weight to 100 parts by weight of the monomer component and more preferably from 0.6 to 7 parts by weight.

In the polymerization step, a chain transfer agent, organic pigments, and inorganic pigments or particles having a hydrophobically finished surface can also be employed.

The aqueous dispersion medium for the polymerization step contains water, such as deionized water, as a main component, and the oily mixture essentially containing the polymerizable component and blowing agent is dispersed therein. The aqueous dispersion medium can further contain alcohols, such as methanol, ethanol and propanol, and hydrophilic organic solvents, such as acetone. The hydrophilic property as used herein means a property of a substance optionally miscible in water. The amount of the aqueous dispersion medium used in the process is not specifically restricted, and preferably ranges from 100 to 1000 parts by weight to 100 parts by weight of the polymerizable component.

In the polymerization step, the aqueous dispersion medium contains a polyester amide having an acid value (mgKOH/g) ranging from 95 to 140 in order to constantly produce heat-expandable microspheres having a mean particle size ranging from 0.01 to 10 μm with high yield and without deteriorating their expansion performance.

The polyester amide should have an acid value (mgKOH/g) ranging from 95 to 140, preferably from 96 to 135, more preferably from 97 to 130, further more preferably from 98 to 119 and most preferably from 99 to 115. The polyester amide having an acid value within the range mentioned above enables a constant and high-yield production of heat-expandable microspheres having a mean particle size ranging from 0.01 to 10 μm and good expansion performance. The polyester amide having an acid value (mgKOH/g) less than 95 is apt to gel excessively in the aqueous dispersion medium and becomes poorly soluble in the medium. This impairs the dispersion stability of the polymerization mixture, and consequently inhibits the constant and high-yield production of heat-expandable microspheres having a mean particle size ranging from 0.01 to 10 μm. On the other hand, the polyester amide having an acid value (mgKOH/g) greater than 140 has an excessive lipophilic property to thereby deteriorate the stability of oil globules in the polymerization step and inhibit the constant production of heat-expandable microspheres having a mean particle size ranging from 0.01 to 10 μm.

The acid value (mgKOH/g) as used herein means the number of milligrams of potassium hydroxide required to neutralize the free carboxyl groups in 1 g of a polyester amide, and is determined according to the method described in the Examples.

The amine value of the polyester amide (mgKOH/g) is not specifically restricted and preferably ranges from 20 to 60, more preferably from 22 to 55, further more preferably from 23 to 50 and most preferably from 24 to 45. The amine value (mgKOH/g) as used herein means the number of milligrams of potassium hydroxide required to neutralize the amine in 1 g of a polyester amide, and is determined according to the method described in the Examples.

The amount of the polyester amide used for the polymerization is not specifically restricted, and preferably ranges from 0.0001 to 5 parts by weight to 100 parts by weight of the total of the polymerizable component and blowing agent, more preferably from 0.0003 to 2.5 parts by weight, further more preferably from 0.0004 to 1 parts by weight, yet more preferably from 0.0005 to 0.5 parts by weight, and most preferably from 0.0001 to 0.3 parts by weight. The amount of the polyester amide less than 0.0001 parts by weight can disturb the stability of the oil globules comprising the polymerizable component and blowing agent in the aqueous dispersion medium and inhibit the constant production of heat-expandable microspheres having a mean particle size ranging from 0.01 to 10 μm. On the other hand, the amount of the polyester amide greater than 5 parts by weight can cause plasticization of the thermoplastic resin shell of the resultant heat-expandable microspheres to thereby deteriorate their expansion performance.

The polyester amide used in the production process of the present invention exhibits excellent performance to thereby stabilize the oil globules dispersed in the suspension and sufficiently prevent the coalescence of oil globules or agglomeration of particles in the polymerization mixture. This allows for production of heat-expandable microspheres having a mean particle size ranging from 0.01 to 10 μm even if a comparatively small amount of the polyester amide is added to the aqueous dispersion medium. Thus, the amount of the polyester amide used as the dispersion stabilizer in the present invention can be decreased from that of conventional dispersion stabilizers. Consequently, the decreased amount of the dispersion stabilizer prevents unnecessary plasticization of the thermoplastic resin constituting the shell of the heat-expandable microspheres. This also enables constant and high-yield production of heat-expandable microspheres having a mean particle size ranging from 0.01 to 10 μm without deteriorating their good expansion performance.

Another advantage of the polyester amide is a further decrease in the mean particle size of the heat-expandable microspheres which is attained by adding the polyester amide in an amount similar to that of conventional dispersion stabilizers.

The production process of the polyester amide having an acid value (mgKOH/g) ranging from 95 to 140 is not specifically restricted, and includes, for example, the reaction of a carboxylic acid having at least two carboxyl groups and an amino alcohol having at least one amino group and two hydroxyl groups. In a preferred embodiment, a dicarboxylic acid is used as the carboxylic acid having at least two carboxyl groups and a dialkanolamine is used as the amino alcohol having at least one amino group and two hydroxyl groups.

The mole ratio of the carboxylic acid having at least two carboxyl groups to the amino alcohol having at least one amino group and two hydroxyl groups in the reaction preferably ranges from 2:1 to 1:2.

The carboxylic acid having at least two carboxyl groups includes dicarboxylic acids, tricarboxylic acids and polyfunctional carboxylic acids. The dicarboxylic acids are not specifically restricted, and include oxalic acid, malonic acid, succinic acid, glutaric acid, adipic acid, piperic acid, suberic acid, azelaic acid, sebacic acid, undecane-α,ω-dicarboxylic acid, dodecane-α,ω-dicarboxylic acid, cis-cyclohexane-1,2-dicarboxylic acid, trans-cyclohexane-1,2-dicarboxylic acid, cis-cyclohexane-1,3-dicarboxylic acid, trans-cyclohexane-1,3-dicarboxylic acid, cis-cyclohexane-1,4-dicarboxylic acid, trans-cyclohexane-1,4-dicarboxylic acid, cis-cyclopentane-1,2-dicarboxylic acid, trans-cyclopentane-1,2-dicarboxylic acid, cis-cyclopentane-1,3-dicarboxylic acid, trans-cyclopentane-1,3-dicarboxylic acid, 2-methyl malonic acid, 2-ethyl malonic acid, 2-phenyl malonic acid, 2-methyl succinic acid, 2-ethyl succinic acid, 2-phenyl succinic acid, itaconic acid, 3,3-dimethyl glutaric acid, maleic acid, fumaric acid, phthalic acid, isophthalic acid and terephthalic acid. The tricarboxylic acids and polyfunctional carboxylic acids are not specifically restricted, and include trimesic acid, trimellitic acid, butanetricarboxylic acid, naphthalenetricarboxylic acid, and cyclohexane-1,3,5-tricarboxylic acid. One of or a combination of at least two of those carboxylic acid can be employed. Of those carboxylic acids having at least two carboxyl groups, adipic acid, itaconic acid, succinic acid, glutaric acid, phthalic acid, isophthalic acid and terephthalic acid are preferable, and adipic acid is more preferable.

The amino alcohol (alkanolamine) having at least one amino group and two hydroxyl groups includes dialkanolamine and trialkanolamine. The dialkanolamine is not specifically restricted and includes, for example, diethanolamine, diisopropanolamine, 2-amino-1,3-propanediol, 3-amino-1,2-propanediol, diisobutanolamine, bis(2-hydroxy-1-butyl)amine, bis(2-hydroxy-1-propyl)amine, and dicyclohexanolamine. The trialkanolamine is not specifically restricted and includes, for example, tris(hydroxymethyl)aminomethane. One of or a combination of at least two of those amino alcohols can be employed. Of those amino alcohols having at least one amino group and two hydroxyl groups, diethanolamine is preferable.

The temperature for carrying out the reaction of the carboxylic acid and amino alcohol is not specifically restricted, and ranges, for example, from 80 to 250° C., preferably from 90 to 200° C. and more preferably from 95 to 180° C. If a catalyst is used for the reaction, the reaction temperature is adjusted for the catalyst preferably within the range from 90 to 200° C., more preferably from 100 to 190° C., and further more preferably from 110 to 180° C.

The reaction of the carboxylic acid and amino alcohol is preferably carried out while being purged with an inert gas, such as nitrogen, or under vacuum. A catalyst or solvent can be optionally added. The reaction water generated during the polymerization (polycondensation) can be removed by, for example, reducing pressure, bubbling with an inert gas, or azeotropic distillation with a proper solvent, such as toluene. The pressure applied to the reaction is not specifically restricted and usually ranges from 0 to 10 MPa. The reaction time is not specifically restricted and the reaction is usually carried out for a period ranging from 5 minutes to 48 hours, preferably from 30 minutes to 24 hours and more preferably from 1 to 10 hours.

The catalyst employed for the reaction of the carboxylic acid and amino alcohol is not specifically restricted and includes, for example, sulfuric acid, phosphoric acid, phosphonic acid, hypophosphite, aluminum sulfate hydrate, alum, acidic silica gel, acidic aluminum oxide, titanate, dialkyl tin oxide, p-toluenesulfonic acid, ammonium phosphate, triphenyl phosphite and dicyclohexylcarbodiimide. The amount of the catalyst used in the reaction preferably ranges from 1 to 5000 ppm to the total weight of the carboxylic acid and amino alcohol, and more preferably from 10 to 1000 ppm.

The reaction of the carboxylic acid and amino alcohol is preferably terminated by, for example, cooling, before gelling of the resultant polymer advances. The gelling point can be identified by the sudden increase of the viscosity of the reaction mixture.

In addition to the polyester amide mentioned above, the aqueous dispersion medium can contain at least one dispersion stabilizer selected from the group consisting of particulate metal compounds, anionic surfactants, nonionic surfactants, cationic surfactants, amphoteric surfactants and polymeric dispersion stabilizers except the polyester amide.

The particulate metal compound is not specifically restricted, and includes, for example, calcium triphosphate, magnesium pyrophosphate and calcium pyrophosphate produced by double reaction, colloidal silica, alumina sol, zirconia sol, titania sol, and magnesium hydroxide. One of or a combination of at least two of those dispersion stabilizers can be used. The aqueous dispersion medium preferably contains a particulate metal compound having a mean particle size ranging from 1.0 to 20 nm in addition to the polyester amide mentioned above in order to achieve more constant and high-yield production of heat-expandable microspheres having a mean particle size ranging from 0.01 to 10 μm. Of those particulate metal compounds, colloidal silica is more preferable. Colloidal silica is commercially available in a form of a dispersion, in other words, a colloidal silica dispersion, and any variants having desirable mean particle sizes of silica and desirable properties including specific surface area are easily available among various grades of products, such as "Quartron" produced by Fuso Chemical Co., Ltd., "ADELITE" produced by Adeka Corporation, "SILICADOL" produced by Nippon Chemical Industrial Co., Ltd., "SNOWTEX" produced by Nissan Chemical Industries, Ltd., "Ludox" produced by DuPont, etc.

The effective concentration of colloidal silica in a colloidal silica dispersion is not specifically restricted, and preferably ranges from 10 to 28 wt %, more preferably from 13 to 26 wt %, further more preferably from 14 to 24 wt %, yet further more preferably from more than 15 wt % to less than 23 wt %, still further more preferably from 16 to 22 wt %, and most preferably from 17 to 21 wt %. The effective concentration of colloidal silica within the range from 10 to 28 wt % enables more constant and high-yield production of heat-expandable microspheres having a mean particle size ranging from 0.01 to 10 μm.

The mean particle size of the particulate metal compound is not specifically restricted and preferably ranges from 1.0 to 20 nm, more preferably from 2.0 to 15 nm, further more preferably from 3.0 to 13 nm, yet further more preferably from 3.5 to 8.0 nm, still further more preferably from 3.8 to 6.0 nm, and most preferably from 4.0 to 5.0 nm. A particulate metal compound having a mean particle size ranging from 1.0 to 20 nm contributes to a more constant and high-yield production of heat-expandable microspheres having a mean particle size ranging from 0.01 to 10 μm.

The mean particle size of the metal compound is the arithmetic mean of the particle size of randomly-selected 500 particles of the metal compound in microphotographs magnified by 250,000 times through a transmission electron microscope (H-800, manufactured by Hitachi, Ltd.).

The aqueous dispersion medium preferably contains a particulate metal compound having a mean particle size ranging from 3.8 to 6.0 nm in addition to the polyester amide having an acid value (mgKOH/g) ranging from 95 to 140. This is because such a compound is effective to achieve constant and high-yield production of heat-expandable microspheres having a mean particle size ranging from 0.01 to 10 μm without deteriorating their expansion performance.

The specific surface area of the particulate metal compound is not specifically restricted, and preferably ranges from 270 to 2720 $m^2/g$, more preferably from 280 to 2500 $m^2/g$, yet more preferably from 290 to 2200 $m^2/g$, still more preferably from 295 to 1800 $m^2/g$, further more preferably from 300 to 1360 $m^2/g$, yet further more preferably from 320 to 1200 $m^2/g$, still further more preferably from 340 to 900 $m^2/g$, still further more preferably from 390 to 800 $m^2/g$ and most preferably from 450 to 700 $m^2/g$. The particulate metal compound having a specific surface area ranging from 270 to 2720 $m^2/g$ contributes to a more constant and high-yield production of heat-expandable microspheres having a mean particle size ranging from 0.01 to 10 μm.

The specific surface area of the particulate metal compound is measured, for example, by the Sears method for measuring the specific surface area of colloidal silica. The Sears method is described in *Analytical Chemistry* (pp. 1981-1983, No. 12, vol. 28, December 1956), and the method employs the quantitative measurement of silanol groups on the surface of silica sol in order to determine the specific surface area of colloidal silica. The surface area of particulate metal compounds other than colloidal silica is measured by the nitrogen adsorption isotherms to obtain the BET surface area according to JIS Z8830 (2013). The detailed procedure of the Sears method will be described in the Examples.

The amount of the particulate metal compound used in the polymerization step is not specifically restricted and preferably ranges from 0.15 to 20 parts by weight to 100 parts by weight of the total amount of the polymerizable component and blowing agent, more preferably from 0.20 to 18 parts by weight, yet more preferably from 0.25 to 16 parts by weight, still more preferably from 0.35 to 14 parts by weight, further more preferably from 0.40 to 12 parts by weight, yet further more preferably from 0.50 to 11.5 parts by weight, and most preferably from 0.55 to 11.3 parts by weight. The amount of the particulate metal compound within the range of 0.15 to 20 parts by weight to 100 parts by weight of the total amount of the polymerizable component and blowing agent contributes to more constant and high-yield production of heat-expandable microspheres having a mean particle size ranging from 0.01 to 10 μm.

The anionic surfactants are not specifically restricted and include, for example, fatty acid salts, such as potassium palmitate and triethanolamine oleate; alkyl sulfate salts, such as sodium lauryl sulfate and ammonium lauryl sulfate; alkyl benzene sulfonate salts, such as sodium dodecyl benzene sulfonate; polyoxyalkylene alkyl ether sulfate salts; alkyl phosphate salts, such as sodium monostearyl phosphate; polyoxyalkylene alkylether phosphate salts, such as sodium polyoxyethylene oleyl ether phosphate; long-chain sulfosuccinate salts, such as sodium dioctyl sulfosuccinate; and polycarboxylate salts, such as sodium polyacrylate.

The nonionic surfactants are not specifically restricted, and include, for example, polyoxyethylene alkyl ethers, such as polyoxyethylene cetyl ether and polyoxyethylene lauryl ether; polyoxyalkylene alkylphenyl ethers, such as polyoxyethylene nonylphenyl ether and polyoxyethylene octylphenyl ether; polyoxyalkylene fatty acid esters, such as polyoxyethylene monolaurate and polyoxyethylene monooleate; sorbitan fatty acid esters, such as sorbitan monopalmitate and sorbitan monooleate; polyoxyalkylene sorbitan fatty acid esters, such as polyoxyethylene sorbitan monostearate and polyoxyethylene sorbitan monooleate; glycerin fatty acid esters, such as glycerin monostearate, glycerin monopalmitate and glycerin monolaurate; polyglycerin fatty acid esters; polyoxyalkylene alkylamines; and oxyethylene-oxypropylene block polymers.

The cationic surfactants are not specifically restricted, and include, for example, alkyl trimethyl ammonium salts, such as stearyl trimethyl ammonium chloride, lauryl trimethyl ammonium chloride and cetyl trimethyl ammonium bromide; dialkyl dimethyl ammonium salts; and trialkyl methyl ammonium salts.

The amphoteric surfactants are not specifically restricted, and include, for example, imidazoline-based amphoteric surfactants, such as 2-undecyl-N,N-(hydroxyethyl carboxymethyl)-2-imidazoline sodium salt; betaine-based amphoteric surfactants, such as 2-heptadecyl-N-carboxymethyl-N-hydroxyethyl imidazolium betaine, lauryl dimethyl amino acetic acid betaine, alkyl betaine, amidobetaine and sulfobetaine; and amino acid-based amphoteric surfactants, such as N-lauryl glycine, N-lauryl β-alanine and N-stearyl β-alanine.

The polymeric dispersion stabilizers other than the polyester amide are not specifically restricted, and include, for example, a condensation product of urea and formaldehyde, gelatin, methyl cellulose, polyvinyl alcohol, polyvinyl pyrolidone, polyethylene imine and polyacrylamide.

The amount of the dispersion stabilizers used in the polymerization step other than the polyester amide and particulate metal compounds preferably ranges from 0.1 to 20 parts by weight to 100 parts by weight of the total of the polymerizable component and blowing agent, and more preferably from 0.2 to 10 parts by weight.

The aqueous dispersion medium can further contain an electrolyte, such as sodium chloride, magnesium chloride, calcium chloride, sodium sulfate, magnesium sulfate, ammonium sulfate, and sodium hydroxide. One of or a combination of at least two of these electrolytes can be used.

The amount of the electrolyte is not specifically restricted, and is preferably less than 30 wt % of the aqueous dispersion medium, more preferably less than 25 wt %, further more preferably less than 20 wt %, yet further more preferably less than 15 wt %, still further more preferably less than 10 wt %, and most preferably less than 5 wt %. The preferable lower limit of the amount of the electrolyte is 0 wt %. An aqueous dispersion medium containing 30 wt % or more of the electrolyte can impair the stability of the oil globules in the polymerization step.

The aqueous dispersion medium can contain at least one water-soluble compound selected from the group consisting of polyalkylene imines having a molecular weight (MW) of at least 1000, and having at least one bond of nitrogen atom and alkyl group substituted with a hydrophilic functional group selected from the group consisting of carboxylic acid (salt) groups and phosphonic acid (salt) groups, potassium dichromate, zirconium sulfate, zirconium acetate, zirconium chloride, zirconium oxide, zirconium nitrate, titanium chloride, alkali metal nitrite salts, metal (III) halides, boric acid, water-soluble ascorbic acids, water-soluble polyphenols, water-soluble vitamin Bs, water-soluble phosphonic acids and phosphonate salts, and water-soluble 1,1-substitution compounds having a carbon atom bonded with a hetero atom and with a hydrophilic functional group selected from the group consisting of hydroxyl group, carboxylic acid (salt)

groups and phosphonic acid (salt) groups. The term "water-soluble" in the present invention means that at least 1 g a substance is soluble in 100 g of water.

The amount of the water-soluble compound contained in the aqueous dispersion medium is not specifically restricted, and preferably ranges from 0.0001 to 1.0 part by weight to 100 parts by weight of the polymerizable component, more preferably from 0.0003 to 0.1 parts by weight, and most preferably from 0.001 to 0.05 parts by weight. An insufficient amount of the water-soluble compound can fail to exert a sufficient effect by the water-soluble compound. On the other hand, an excessive amount of the water-soluble compound can decrease the polymerization rate or increase the amount of the residue from the polymerizable component which is the raw material of the microspheres.

The aqueous dispersion medium is prepared, for example, by blending the dispersion stabilizer and optionally an electrolyte and/or water-soluble compound with water (deionized water).

The aqueous dispersion medium in the polymerization of the present invention usually has a pH of 7 or less. The pH of the aqueous dispersion medium preferably ranges from 1.5 to 5, more preferably from 1.8 to 4.8, further more preferably from 2 to 4.5, still further more preferably from 2.2 to 4, and most preferably from 2.4 to 3.8. An aqueous dispersion medium having a pH higher than 7 in the polymerization can make unstable globules of the oily mixture dispersed in the aqueous dispersion medium in the polymerization step to cause agglomeration of the ingredients or polymerization products.

The polymerization of the process of the present invention can be carried out in the presence of sodium hydroxide or a combination of sodium hydroxide and zinc chloride.

The polymerization step is carried out by blending the polymerizable component essentially containing the monomer component and optionally containing a cross-linking agent; the blowing agent; the aqueous dispersion medium essentially containing water and the polyester amide as the dispersion stabilizer and optionally containing another dispersion stabilizer, an electrolyte and a water-soluble compound; and the polymerization initiator to polymerize the polymerizable component. The order of mixing those components is not specifically restricted, and components soluble or dispersible in the aqueous dispersion medium can be mixed with the aqueous dispersion medium before other components are blended.

In the polymerization step, the oily mixture comprising a polymerizable component and blowing agent is dispersed and suspended in the aqueous dispersion medium to be formed into oil globules of a prescribed particle size. The process of the present invention produces heat-expandable microspheres having a mean particle size ranging from 0.01 to 10 µm, and the oil globules of the oily mixture are preferably dispersed and suspended into globules having a particle size ranging from 0.01 to 10 µm in the polymerization step.

The methods for dispersing and suspending the oily mixture include generally known dispersion techniques, such as agitation with a Homo-mixer (for example, a device produced by Primix Corporation) or a Homo-disper (for example, a device produced by Primix Corporation), dispersion with a static dispersing apparatus such as a Static mixer (for example, a device produced by Noritake Engineering Co., Ltd.), membrane emulsification technique, ultrasonic dispersion, and micro-channel dispersion.

Then suspension polymerization is started by heating the dispersion in which the oily mixture is dispersed into oil globules in the aqueous dispersion medium. During the polymerization reaction, the dispersion is preferably agitated gently to prevent the floating of monomers and sedimentation of polymerized heat-expandable microspheres.

The polymerization temperature can be set optionally depending on the variant of the polymerization initiator, and is preferably controlled within the range from 30 to 100° C., more preferably from 40 to 90° C., and most preferably from 50 to 85° C. The polymerization temperature is preferably maintained for about 0.1 to 20 hours. The initial pressure for the polymerization is not specifically restricted, and is preferably controlled within the range from 0 to 5.0 MPa in gauge pressure, more preferably from 0.1 to 3.0 MPa and most preferably from 0.2 to 2.0 MPa.

The aqueous dispersion medium containing heat-expandable microspheres after the polymerization step (hereinafter also referred to as the polymerization liquid) sometimes contains, in addition to the intended heat-expandable microspheres, byproducts (scum) such as coarse microspheres formed from the coalescence of oil globules, agglomeration of microspheres and residue from polymerization generated secondarily in the aqueous dispersion medium, and the byproducts cause decrease in the yield of the heat-expandable microspheres. Such byproducts are usually larger than the particle sizes of the heat-expandable microspheres and do not pass a sieve of a certain mesh size. Thus, the ratio of heat-expandable microspheres passing a sieve of a certain mesh size indicates a constant and high-yield production of heat-expandable microspheres and is useful for evaluating the production stability of heat-expandable microspheres. The production stability of heat-expandable microspheres is preferably at least 87 wt %, more preferably at least 88 wt %, further more preferably at least 90 wt %, yet further more preferably at least 91 wt %, and most preferably at least 92 wt %. A production stability of heat-expandable microspheres less than 87 wt % indicates that the process has failed to produce the heat-expandable microspheres constantly with high yield. The definition of the production stability of heat-expandable microspheres will be described in detail in Examples.

The aqueous dispersion medium containing heat-expandable microspheres after the polymerization step (hereinafter also referred to as the polymerization liquid) is separated to isolate the heat-expandable microspheres from the aqueous dispersion medium by several isolation methods, for example, suction filtration, pressure filtration or centrifugal separation, and consequently a wet cake of the heat-expandable microspheres is obtained.

The resultant heat-expandable microspheres (usually a wet cake of heat-expandable microspheres) are dried in an oven, reduced-pressure drier or flash drier to be prepared into dry heat-expandable microspheres. In addition, the mass of the dry heat-expandable microspheres can be optionally crumbled and classified by sieving.

The heat-expandable microspheres can be washed with water in the process of preparing dry heat-expandable microspheres from the aqueous dispersion medium containing the heat-expandable microspheres for the purpose of removing the components of the aqueous dispersion medium other than water to refine the heat-expandable microspheres.

Heat-Expandable Microspheres

Figure 1:
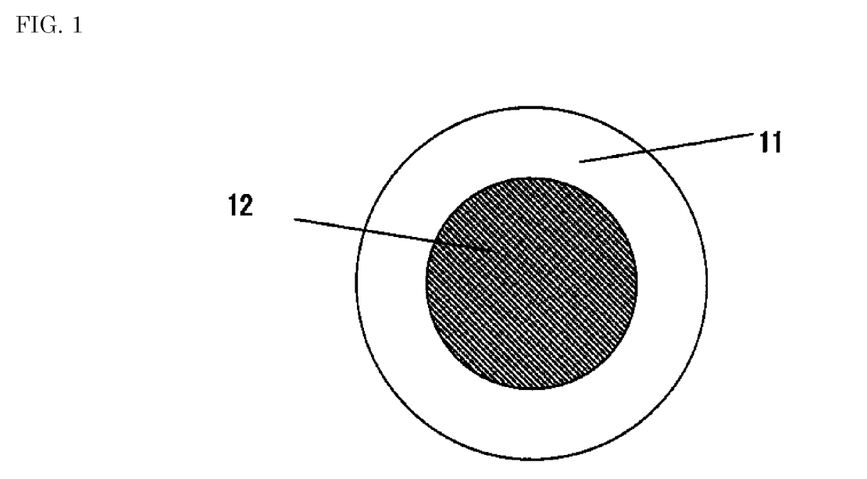
FIG. 1 is a schematic diagram of an example of the heat-expandable microspheres.

The heat-expandable microspheres of the present invention will next be described below. The heat-expandable microspheres, as shown in FIG. 1, have a core-shell structure comprising a thermoplastic resin shell 11 and a core of a blowing agent 12 encapsulated therein and vaporizable by heating, and the heat-expandable microspheres have thermal expansion performance as a whole (in other words, a whole of a heat-expandable microsphere expands by heating). The thermoplastic resin, the polymerizable component to be polymerized into the thermoplastic resin, the monomer component constituting the polymerizable component, and the blowing agents are as those mentioned above.

The mean particle size of the heat-expandable microspheres of the present invention ranges from 0.01 to 10 µm. The mean particle size of the heat-expandable microspheres can be designed freely within the range depending on their application, and is not specifically restricted. The mean particle size preferably ranges from 0.05 to 9.0 µm, more preferably from 0.07 to 8.0 µm, yet more preferably from 0.1 to 7.0 µm, still more preferably from 0.5 to 6.0 µm, further more preferably from 0.7 to 4.9 µm, yet further more preferably from 0.9 to 4.0 µm, and most preferably from 1.0 to 3.5 µm. The mean particle size of the heat-expandable microspheres of the present invention is represented by the mean volume diameter ($D_{50}$) determined by laser diffraction-scattering particle size distribution analysis based on the volume of the sample, which is determined by the method described in the following Example.

The coefficient of variation, CV, of the particle size distribution of the heat-expandable microspheres is not specifically restricted, and is preferably not greater than 35%, more preferably not greater than 30%, and most preferably not greater than 25%. The CV can be calculated by the following formulae (1) and (2).

$$CV = (s/\langle x \rangle) \times 100(\%) \qquad (1)$$

$$s = \left\{ \sum_{i=1}^{n} (x_i - \langle x \rangle)^2 / (n-1) \right\}^{1/2} \qquad (2)$$

(where s is a standard deviation of the particle size of the microspheres, $\langle x \rangle$ is a mean particle size of the microspheres, "xi" is the particle size of the i-th particle, and n represents the number of particles)

The true specific gravity of the heat-expandable microspheres at their maximum expansion preferably ranges from 0.01 to 0.30, more preferably from 0.02 to 0.29, yet preferably from 0.03 to 0.25, further more preferably from 0.04 to 0.20, still further more preferably from 0.05 to 0.15 and most preferably from 0.07 to 0.13. The heat-expandable microspheres having a mean particle size ranging from 0.01 to 10 µm produced in the process of the present invention have sufficient expansion performance, and thus exhibit satisfactory true specific gravity at their maximum expansion as indicated by those ranges.

The encapsulation ratio of the blowing agent is defined as the percentage of the blowing agent encapsulated in heat-expandable microspheres to the weight of the heat-expandable microspheres. The encapsulation ratio of the blowing agent is not specifically restricted, and is optionally settled depending on the application of the resultant heat-expandable microspheres. The encapsulation ratio preferably ranges from 1 to 35 wt %, more preferably from 2 to 30%, and most preferably from 3 to 25%. An encapsulation ratio of the blowing agent less than 1% can lead to insufficient effect by the blowing agent. On the other hand, an encapsulation ratio of the blowing agent higher than 35% can excessively thin the shell of heat-expandable microspheres to make the blowing agent escape through the shell and decrease the heat resistance and expansion performance of the microspheres.

The expansion-initiation temperature (Ts) of the heat-expandable microspheres is not specifically restricted, and preferably ranges from 60 to 250° C., more preferably from 70 to 230° C., further more preferably from 80 to 200° C., yet further more preferably from 90 to 180° C., and most preferably from 100 to 160° C. Heat-expandable microspheres having an expansion-initiation temperature lower than 60° C. can have poor storage stability and may not be suitable for blending with compositions, such as paints and resins.

The maximum expansion temperature ($T_{max}$) of the heat-expandable microspheres is not specifically restricted, and preferably ranges from 80 to 300° C., more preferably from 90 to 280° C., further more preferably from 100 to 250° C., yet further more preferably from 110 to 230° C., and most preferably from 120 to 210° C. Heat-expandable microspheres having a maximum expansion temperature lower than 80° C. may not be suitable for blending with compositions, such as paints and resins.

The amount of ash contained in the heat-expandable microspheres is preferably not higher than 10 wt %, more preferably not higher than 8 wt %, yet more preferably not higher than 5 wt %, still more preferably not higher than 4 wt %, further more preferably not higher than 3 wt %, and most preferably not higher than 2.5 wt %. The heat-expandable microspheres containing ash in an amount higher than 10 wt % can inhibit the reduction of the weight of the compositions or formed products blended with the heat-expandable microspheres or the hollow particles mentioned below and adversely affect the physical properties of those compositions and products. The ash contained in heat-expandable microspheres is estimated to be mainly derived from the metal components in the dispersion stabilizer, and the desirable lower limit of the ash in heat-expandable microspheres is 0 wt %.

The amount of silicon contained in the heat-expandable microspheres is preferably not higher than 10 wt %, more preferably not higher than 9 wt %, yet more preferably not higher than 8 wt %, still more preferably not higher than 7 wt %, further more preferably not higher than 6 wt %, yet further more preferably not higher than 5 wt %, still further more preferably not higher than 4.5 wt %, still further more preferably not higher than 4 wt %, still further more preferably not higher than 3.5 wt %, still further more preferably not higher than 3 wt %, and most preferably not higher than 2.5 wt %. The heat-expandable microspheres containing silicon in an amount higher than 10 wt % can result in poor dispersibility of the heat-expandable microspheres and the hollow particles mentioned below in compositions or formed products blended with those microspheres. The desirable lower limit of silicon in the heat-expandable microspheres is 0 wt %.

Hollow Particles

The hollow particles of the present invention are manufactured by thermally expanding the heat-expandable microspheres having a mean particle size ranging from 0.01 to 10 µm produced in the process mentioned above.

The hollow particles of the present invention are lightweight and improve the physical properties of a composition or formed product blended with the hollow particles.

The process for producing the hollow particles includes dry thermal expansion methods and wet thermal expansion methods. The thermal expansion temperature for the heat-expandable microspheres preferably ranges from 60° C. to 350° C.

The mean particle size of the hollow particles is not specifically restricted, and can be optionally designed depending on the application of the microspheres. The mean particle size preferably ranges from 0.1 to 1000 µm, and more preferably from 0.8 to 200 µm. The coefficient of variation, CV, of the particle size distribution of the hollow particles is not specifically restricted, and should preferably be not greater than 30%, and more preferably not greater than 25%.

The amount of ash contained in the hollow particles is preferably not higher than 10 wt %, more preferably not higher than 8 wt %, yet more preferably not higher than 5 wt %, still more preferably not higher than 4 wt %, further more preferably not higher than 3 wt %, and most preferably not higher than 2.5 wt %. The hollow particles containing ash in an amount higher than 10 wt % can inhibit the reduction of the weight of the compositions or formed products blended with the hollow particles, and can adversely affect the physical properties of the compositions and products. The ash contained in the hollow particles is estimated to be mainly derived from the metal components in the dispersion stabilizer, and the desirable lower limit of the ash in the hollow particles is 0 wt %.

The amount of silicon contained in the hollow particles is preferably not higher than 5 wt %, more preferably not higher than 4.5 wt %, yet more preferably not higher than 4 wt %, still more preferably not higher than 3.5 wt %, further more preferably not higher than 3 wt %, and most preferably not higher than 2.5 wt %. The hollow particles containing silicon in an amount higher than 5 wt % can result in poor dispersibility of hollow particles in compositions or formed products blended with the hollow particles. The desirable lower limit of silicon in the hollow particles is 0 wt %.

The true specific gravity of the hollow particles is not specifically restricted, and preferably ranges from 0.01 to 0.5, more preferably from 0.02 to 0.40, yet more preferably from 0.03 to 0.35, further more preferably from 0.04 to 0.30 and most preferably from 0.05 to 0.20.

Figure 2:
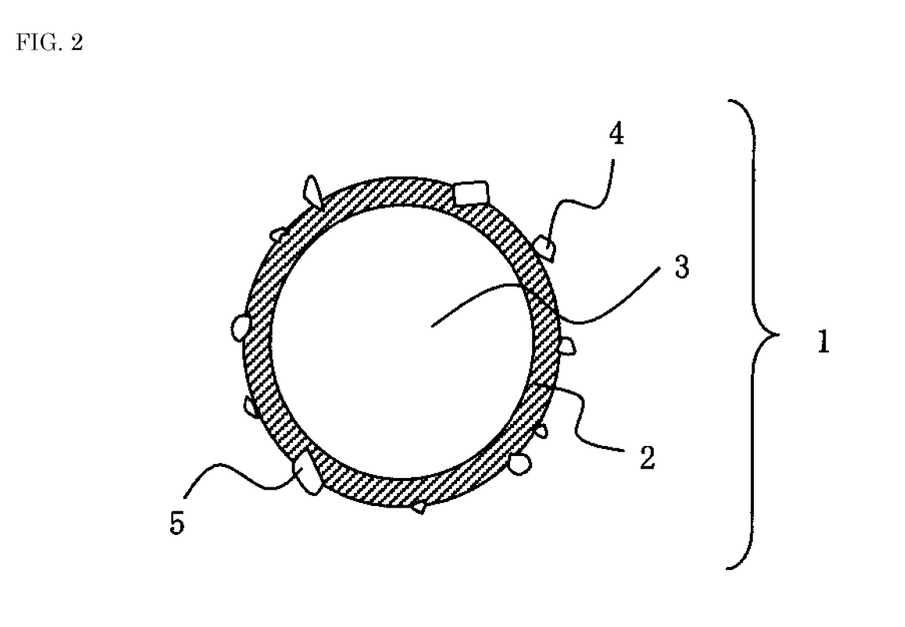
FIG. 2 is a schematic diagram of an example of the hollow particles.

The hollow particles (1) can contain fine particles (4) and (5) coating the outer surface of their shell (2) as shown in FIG. 2, and such hollow particles having a void (3) are hereinafter also referred to as fine-particle-coated hollow particles (1).

The coating mentioned here means that the fine particles (4) or (5) can be in a state of adhesion (4) on the outer surface of the shell (2) of the particulate-coated hollow particles (1), or in a state of fixation in a dent (5) on the outer surface of the shell of the fine-particle-coated hollow particles as the result of the fine particle pushing into the thermoplastic shell melted by heat. The fine-particle-coated hollow particles have improved handling property.

The fine particle can be selected from various materials including both inorganic and organic materials. The shape of the fine particle includes spherical, needle-like and plate-like shapes.

The mean particle size of the fine particles, which is selected according to the hollow particles to be coated, is not specifically restricted and preferably ranges from 0.001 to 30 µm, more preferably from 0.005 to 25 µm and most preferably from 0.01 to 20 µm.

The mean particle size of the fine particle is preferably 1/10 or less of the mean particle size of the fine-particle-coated hollow particles. The mean particle size as used herein means the mean particle size of primary particles.

The fine-particle-coated hollow particles can be produced by thermally expanding fine-particle-coated heat-expandable microspheres. The preferable process for manufacturing the fine-particle-coated hollow particles includes the steps of blending heat-expandable microspheres and a fine particle (blending step), and heating the mixture prepared in the blending step at a temperature higher than the softening point of the thermoplastic resin constituting the shell of the heat-expandable micro spheres to expand the heat-expandable microspheres and simultaneously coat the outer surface of the shell of the resultant hollow particles with the fine particles (coating step).

The true specific gravity of the fine-particle-coated hollow particles is not specifically restricted, and preferably ranges from 0.01 to 0.7, more preferably from 0.02 to 0.5, further more preferably from 0.05 to 0.3, and most preferable from 0.07 to 0.2. The particulate-coated hollow particles having a true specific gravity less than 0.01 can have poor durability. On the other hand, the particulate-coated hollow particles having a true specific gravity greater than 0.7 can be poorly effective for decreasing the specific gravity of compositions. This is because a greater amount of the fine-particle-coated hollow particles is required for blending with the compositions leading to poor cost performance.

The moisture content of the hollow particles is not specifically restricted, and is preferably not higher than 0.5 wt %, more preferably not higher than 0.4 wt %, further more preferably not higher than 0.35 wt %, and most preferably not higher than 0.3 wt %. The lower limit of the moisture content of the hollow particles is 0 wt %. The moisture is present in the hollow particles in a form like crystalline water.

The fine-particle-coated hollow particles can be blended in a composition mentioned below, and such composition is useful as, for example, an adhesive composition.

Compositions and Formed Products

The composition of the present invention contains a base component and at least one particulate material selected from the group consisting of the heat-expandable microspheres-mentioned above, the heat-expandable microspheres produced in the process for producing heat-expandable microspheres mentioned above and the hollow particles mentioned above, and a base component. Thus the composition of the present invention has good material properties.

The base component is not specifically restricted, and includes, for example, rubbers, such as natural rubber, butyl rubber, silicone rubber, and ethylene-propylene-diene rubber (EPDM); thermosetting resins, such as unsaturated polyesters, epoxy resins and phenol resins; waxes, such as polyethylene waxes and paraffin waxes; thermoplastic resins, such as ethylene-vinyl acetate copolymers (EVA), ionomers, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), and polystyrene (PS); thermoplastic elastomers, such as olefin-based elastomers and styrene-based elastomers; bioplastics, such as polylactic acid (PLA) and starch resins; sealing materials, such as modified silicone-based materials, silicone-based materials, polyurethane-based materials, polysulfide-based materials, acrylate-based materials, polyisobutylene-based materials, and butyl rubber-based materials; paint components, such as urethane polymers, ethylene-vinyl acetate copolymers, vinyl chloride polymers, and acrylate polymers; inorganic materials, such as cement, mortar, and cordierite; and negative electrode binders and negative electrode active material for the negative electrode of a lithium-ion secondary battery.

The amount of the particulate materials contained in the composition of the present invention is not specifically restricted, and preferably ranges from 0.1 to 30 wt %, more preferably from 0.3 to 25 wt %, and most preferably from 0.5 to 20 wt %, in order to attain desirable effects, better weight reduction of the resultant products, and uniform blending of the composition with the particulate materials.

The composition can contain additives in addition to the base component and the particulate materials. The additive include fillers conventionally used for weight reduction, such as perlite, fly ash, shirasu balloons, glass balloons, phenol balloons, carbon balloons, alumina bubbles and expandable styrene beads; reinforcing materials, such as glass fiber and aramid fiber; fillers, such as silica, talc and calcium carbonate; and pigments, such as titanium oxide and magnesium oxide. One of or a combination of at least two of those additives can be used.

The composition of the present invention is prepared by mixing these particulate materials and the base components.

Applications of the composition of the present invention include, for example, molding compositions, paint compositions, clay compositions, fiber compositions, adhesive compositions, powder compositions, and slurry compositions for electrodes. Specifically, the composition of the present invention can be used to impart anti-shrink, lightweight or thermal insulation properties to cosmetics, putties, paints, sealants, mortar, paper clay, ceramic and artificial marble, and can be incorporated in a slurry composition for the negative electrode of lithium-ion secondary batteries.

The formed product of the present invention can be produced by forming the composition. The formed product of the present invention includes, for example, molded products and coating films. The formed product of the present invention has improved properties including a lightweight effect, porosity, sound absorbing performance, thermal insulation, design potential, shock absorbing performance and strength, and low thermal conductivity and dielectric property.

The formed product of the present invention produced from the composition mentioned above has a lightweight property and good material properties.

The formed product containing an inorganic material as a base component is calcined into ceramic filters, etc., containing closed cells.

EXAMPLES

The present invention will be described in greater detail with respect to the following Examples and Comparative Examples, although the present invention is not restricted thereto. In the following Examples and Comparative Examples, "part(s)" means "part(s) by weight" unless otherwise specified.

The properties of the ingredients and products and the processing conditions mentioned in the following Examples and Comparative Examples were tested and evaluated by the methods described below.

Acid Value and Amine Value of Polyester Amide

The acid value was determined according to JIS K2501 (2003).

The amine value was determined according to JIS K7237 (1995).

pH

The pH of the aqueous dispersion medium was determined with a pH meter (HM-12P, manufactured by DKK-Toa Corporation).

Production Stability

An aqueous dispersion medium containing polymerized heat-expandable microspheres was prepared in an amount of $W_6$ (g) and sifted with a metal sieve (200 μm mesh, manufactured by Kansai Wire Netting Co., Ltd.). The weight of the aqueous dispersion medium passing the sieve, $W_5$ (g), was measured. The percentage of the aqueous dispersion medium passing the sieve, Y (wt %), was calculated from $W_5$ (g) and $W_6$ (g) by the following formula (3).

$$Y(\text{wt \%}) = (W_5/W_6) \times 100 \quad (3)$$

According to sieve passing ratio, Y (wt %), was used to indicate the production stability of the heat-expandable microspheres.

Mean Particle Size and Particle Size Distribution of Heat-Expandable Microspheres The heat-expandable microspheres were analyzed in a wet system of a laser diffraction particle size analyzer (HEROS & RODOS, manufactured by SYMPATEC), and the mean volume diameter, $D_{50}$, determined in the analysis was defined as the mean particle size.

Determination of Expansion-Initiation Temperature (Ts) and Maximum Expansion Temperature ($T_{max}$) of Heat-Expandable Microspheres The temperatures Ts and $T_{max}$ were determined with a DMA (DMA Q800, manufactured by TA Instruments). In an aluminum cup 4.8 mm deep and 6.0 mm in diameter (5.65 mm in inside diameter), 0.5 mg of dried heat-expandable microspheres were placed, and the cup was covered with an aluminum cap 0.1 mm thick and 5.6 mm in diameter to prepare a sample. The sample was set on the device and subjected to the pressure of 0.01 N with the compression unit of the device, and the height of the sample was measured. The sample was then heated at temperature levels elevating at a rate of 10° C./min within the temperature range from 20 to 300° C., being subjected to the pressure of 0.01 N with the compression unit, and the vertical change of the position of the compression unit was measured. The temperature at which the compression unit started to change its position to the positive direction was determined as the expansion-initiation temperature (Ts), and the temperature at which the compression unit indicated the highest position was determined as the maximum expansion temperature (Tmax).

True Specific Gravity of Hollow Particles

The true specific gravity of the hollow particles was determined by a liquid substitution method (Archimedean method) with isopropyl alcohol in an atmosphere at 25° C. and 50% RH (relative humidity) as described below.

At first, an empty 100-mL measuring flask was dried and weighed ($WB_1$). Then isopropyl alcohol was poured into the weighed measuring flask to form meniscus accurately, and the measuring flask filled with isopropyl alcohol was weighed ($WB_2$). The 100-mL measuring flask was then emptied, dried, and weighed ($WS_1$). About 50 mL of hollow particles were placed in the weighed measuring flask, and the measuring flask containing the hollow particles was weighed ($WS_2$). Then isopropyl alcohol was poured into the measuring flask containing the hollow particles to form meniscus accurately without taking bubbles into the isopropyl alcohol, and the flask filled with the hollow particles and isopropyl alcohol was weighed ($WS_3$). The values, $WB_1$, $WB_2$, $WS_1$, $WS_2$, and $WS_3$, were introduced into the following formula to calculate the true specific gravity (d) of the hollow particles.

$$d = [(WS_2 - WS_1) \times (WB_2 - WB_1)/100]/[(WB_2 - WB_1) - (WS_3 - WS_2)]$$

Determination of True Specific Gravity of Microspheres at Maximum Expansion

A 12 cm long, 13 cm wide, and 9 cm high box having a flat bottom was made of aluminum foil, and 1.0 g of heat-expandable microspheres was filled into uniform thickness. Then the heating of the microspheres was started at the expansion initiation temperature obtained by the measuring method mentioned above. The heating temperature was repeatedly raised by 5° C. and maintained for 1 minute to heat the microspheres, and at each step of temperature raising the true specific gravity of the expanded microspheres (hollow particles) was determined in the same manner as in the determination method of true specific gravity mentioned above. The lowest true specific gravity of the results was defined as the true specific gravity of the microspheres at their maximum expansion.

Specific Surface Area of Colloidal Silica

The specific surface area of colloidal silica was measured by the Sears method described below.

1) Weigh W (g) of colloidal silica containing 1.5 g of silicon dioxide ($SiO_2$) in a beaker. After conditioning the beaker containing the silicon dioxide at 25° C. in a thermostatic chamber, add pure water to 90 mL. Then carry out the following operations in a thermostatic chamber at 25° C.

2) Add 0.1-N hydrogen chloride solution to the sample to adjust the pH of the sample 3.6.

3) Add 30 g of sodium chloride (reagent grade) to the sample, then add water to 150 mL, and agitate for 10 min.

4) Place a pH electrode in the sample, and adjust the pH of the sample at 4.0 by dropping 0.1-N sodium hydroxide aqueous solution into the sample with agitation.

5) After adjusting the pH at 4.0, titrate the sample with a 0.1-N sodium hydroxide aqueous solution. Record the titer and pH at least 4 times within the pH range from 8.7 to 9.3, and prepare the calibration curve based on the titer of the 0.1-N sodium hydroxide aqueous solution, X, and the pH by the titer, Y.

6) Calculate the corrected amount, V (mL), of 0.1-N sodium hydroxide aqueous solution required to change the pH of the sample containing 1.5 g of silicon dioxide from 4.0 to 9.0 by the following formula (4), and calculate the specific surface area, SA ($m^2/g$), by the following formula (5).

$$V=(A \times f \times 100 \times 1.5)/(W \times C) \quad (4)$$

$$SA=29.0V-28 \quad (5)$$

The symbols in formulae (4) and (5) having the following meanings.

A: the actual amount (mL) of the 0.1-N sodium hydroxide aqueous solution required to change the pH of the sample containing 1.5 g of silicon dioxide from 4.0 to 9.0 f: the factor of the 0.1-N sodium hydroxide aqueous solution

C: the concentration (%) of silicon dioxide in the colloidal silica

W: the amount of colloidal silica (g) weighed in the beaker

Example 1

An aqueous dispersion medium was prepared by adding 200 g of colloidal silica dispersion A (containing 20 wt % of colloidal silica having a mean particle size of 5 nm and specific surface area of 550 $m^2/g$) and 1.0 g of polyester amide A (adipic acid-diethanolamine condensation product with the acid value of 96 mgKOH/g and amine value of 15 mgKOH/g) as the polyester amide to 600 g of deionized water and adjusting the pH of the mixture at 3.0.

An oily mixture was prepared by mixing a monomer component (consisting of 180 g of acrylonitrile, 105 g of methacrylonitrile and 15 g of methyl methacrylate), crosslinking agent (1.5 g of trimethylolpropane trimethacrylate), blowing agent (30 g of isobutane and 30 g of isopentane) and polymerization initiator (2.0 g of 2,2'-azobis (2,4-dimethylvaleronitrile)).

The aqueous dispersion medium and the oily mixture were mixed and the mixture was agitated with a Homomixer at 12000 rpm for 5 min to prepare a suspension. Then the suspension was transferred into a compressive reactor 1.5-liter capacity, purged with nitrogen, and polymerized at 60° C. for 15 hours by agitating the suspension at 80 rpm under an initial reaction pressure at 0.2 MPa. The resultant polymerization product was filtered and dried to obtain heat-expandable microspheres. The properties of the resultant microspheres were evaluated and the result is shown in Table 1.

Examples 2 to 8 and Comparative Examples 1 to 5

Heat-expandable microspheres were produced in the same manner as that of Example 1, except that the components of the aqueous dispersion medium and oily mixture were replaced with those shown in Table 1. The properties of the resultant heat-expandable microspheres of each of the Examples and Comparative examples are shown in Table 1. The abbreviations in Table 1 are explained in Table 2.

TABLE 1

| | | Examples | | | | | | |
|---|---|---|---|---|---|---|---|---|
| | | 1 | 2 | 3 | 4 | 5 | 6 | 7 |
| Aqueous dispersion medium | Deionized water (g) | 600 | 680 | 700 | 740 | 650 | 400 | 600 |
| | Sodium chloride (g) | — | — | — | — | — | — | 150 |
| | Colloidal silica dispersion A (g) | 200 | 120 | 100 | — | — | — | 200 |
| | Colloidal silica dispersion B (g) | — | — | — | — | — | 200 | — |
| | Colloidal silica dispersion C (g) | — | — | — | — | — | — | — |
| | Colloidal silica dispersion E (g) | — | — | — | 40 | — | — | — |
| | Colloidal silica dispersion G (g) | — | — | — | — | 200 | — | — |
| | Polyester amide A (g) | 1.0 | — | — | 1.0 | — | 0.5 | 1.5 |
| | Polyester amide B (g) | — | 1.5 | — | — | 1.0 | 0.5 | — |
| | Polyester amide C (g) | — | — | 1.5 | 3.0 | 0.5 | 0.5 | — |
| | Polyester amide D (g) | — | — | — | — | — | — | — |
| | Polyester amide E (g) | — | — | — | — | — | — | — |
| | CMPEI (g) | — | — | — | 0.10 | — | — | 0.10 |
| | $AlCl_3 \cdot 6H_2O$ (g) | — | — | 0.15 | — | — | — | — |
| | Potassium dichromate (g) | — | — | — | — | — | — | — |
| | pH | 3.0 | 2.0 | 3.0 | 2.0 | 3.0 | 3.0 | 3.0 |
| Monomer | AN (g) | 180 | 180 | 150 | 135 | 180 | 180 | 180 |
| | MAN (g) | 105 | 105 | 130 | — | 105 | 105 | 150 |
| | MMA (g) | 15 | 15 | — | 30 | 15 | 15 | 70 |

TABLE 1-continued

| | | | | | | | | |
|---|---|---|---|---|---|---|---|---|
| | IBX (g) | — | — | 20 | — | — | — | — |
| | VCl₂ (g) | — | — | — | 135 | — | — | — |
| | MAA (g) | — | — | — | — | — | — | — |
| Cross-linking agent | Cross-linking agent A (g) | 1.5 | 1.5 | — | 0.5 | 1.5 | — | 1.5 |
| | Cross-linking agent B (g) | — | — | 1.0 | 0.5 | — | — | — |
| Blowing agent | Isobutane (g) | 30 | 30 | — | 70 | 30 | — | 40 |
| | Neopentane (g) | — | — | — | — | — | — | — |
| | Isopentane (g) | 30 | 30 | 50 | — | 30 | 40 | 40 |
| | Isooctane (g) | — | — | — | — | — | 20 | — |
| Polymerization initiator | Initiator A (g) | 2.0 | 2.0 | 2.0 | — | 2.0 | 2.0 | — |
| | Initiator B (g) | — | — | — | 3.0 | — | — | 2.0 |
| Heat-expandable microspheres | Mean particle size (μm) | 0.9 | 1.5 | 2.0 | 3.9 | 5.2 | 1.9 | 2.5 |
| | Expansion initiation temp. Ts (°C.) | 105 | 103 | 118 | 85 | 105 | 112 | 120 |
| | Maximum expansion temp. Tmax (°C.) | 126 | 130 | 147 | 110 | 132 | 144 | 150 |
| Production stability | Aqueous dispersion medium passing the sieve Y (wt %) | 91 | 92 | 92 | 89 | 94 | 90 | 92 |
| Expansion performance | True specific gravity at maximum expansion | 0.28 | 0.15 | 0.07 | 0.05 | 0.04 | 0.18 | 0.05 |

| | | Examples | Comparative Examples | | | | |
|---|---|---|---|---|---|---|---|
| | | 8 | 1 | 2 | 3 | 4 | 5 |
| Aqueous dispersion medium | Deionized water (g) | 650 | 400 | 400 | 400 | 600 | 680 |
| | Sodium chloride (g) | 150 | — | — | — | — | — |
| | Colloidal silica dispersion A (g) | 200 | 400 | 400 | 400 | 200 | — |
| | Colloidal silica dispersion B (g) | — | — | — | — | — | — |
| | Colloidal silica dispersion C (g) | — | — | — | — | — | 120 |
| | Colloidal silica dispersion E (g) | — | — | — | — | — | — |
| | Colloidal silica dispersion G (g) | — | — | — | — | — | — |
| | Polyester amide A (g) | — | — | — | — | — | — |
| | Polyester amide B (g) | 3.0 | — | — | — | — | — |
| | Polyester amide C (g) | — | — | — | — | — | — |
| | Polyester amide D (g) | — | 1.5 | 2.5 | — | 3.0 | — |
| | Polyester amide E (g) | — | 1.5 | 2.5 | — | — | 3.0 |
| | CMPEI (g) | 0.10 | — | — | — | — | — |
| | AlCl₃·6H₂O (g) | — | — | — | — | — | — |
| | Potassium dichromate (g) | — | — | — | — | — | 0.15 |
| | pH | 3.0 | 3.0 | 3.0 | 3.0 | 3.0 | 4.0 |
| Monomer | AN (g) | 90 | 180 | 180 | 180 | 180 | 323 |
| | MAN (g) | 90 | 105 | 105 | 105 | 105 | — |
| | MMA (g) | — | 15 | 15 | 15 | 15 | — |
| | IBX (g) | — | — | — | — | — | — |
| | VCl₂ (g) | — | — | — | — | — | 139 |
| | MAA (g) | 120 | — | — | — | — | — |
| Cross-linking agent | Cross-linking agent A (g) | 1.5 | — | — | — | 1.5 | — |
| | Cross-linking agent B (g) | — | — | — | — | — | — |
| Blowing agent | Isobutane (g) | — | — | — | — | 30 | — |
| | Neopentane (g) | — | — | — | — | — | 139 |
| | Isopentane (g) | 25 | 50 | 50 | 50 | 30 | — |
| | Isooctane (g) | 25 | — | — | — | — | — |
| Polymerization initiator | Initiator A (g) | 2.0 | 2.0 | 2.0 | 2.0 | 2.0 | 2.0 |
| | Initiator B (g) | — | — | — | — | — | — |
| Heat-expandable microspheres | Mean particle size (μm) | 6.1 | 1.7 | 1.5 | * | 10.5 | 11.0 |
| | Expansion initiation temp. Ts (°C.) | 162 | 105 | 104 | — | 103 | 85 |
| | Maximum expansion temp. Tmax (°C.) | 188 | 131 | 128 | — | 135 | 110 |
| Production stability | Aqueous dispersion medium passing the sieve Y (wt %) | 91 | 80 | 87 | — | 73 | 66 |
| Expansion performance | True specific gravity at maximum expansion | 0.02 | 0.25 | 0.56 | — | 0.02 | 0.02 |

* Agglomerated and solidified

TABLE 2

| Abbreviation | Description |
|---|---|
| Colloidal silica dispersion A | 20-wt % dispersion of the colloidal silica with a mean particle size of 5 nm and specific surface area of 550 m²/g |
| Colloidal silica dispersion B | 20-wt % dispersion of the colloidal silica with a mean particle size of 11 nm and specific surface area of 260 m²/g |
| Colloidal silica | 30-wt % dispersion of the colloidal silica with a mean particle size of 12 nm |

TABLE 2-continued

| Abbreviation | Description |
| --- | --- |
| dispersion C | and specific surface area of 238 m²/g |
| Colloidal silica dispersion E | 15-wt % dispersion of the colloidal silica with a mean particle size of 1.3 nm and specific surface area of 2090 m²/g |
| Colloidal silica dispersion G | 20-wt % dispersion of the colloidal silica with a mean particle size of 8.5 nm and specific surface area of 320 m²/g |
| Polyester amide A | Adipic acid-diethanolamine condensation product with an acid value of 96 mgKOH/g and amine value of 15 mgKOH/g |
| Polyester amide B | Adipic acid-diethanolamine condensation product with an acid value of 105 mgKOH/g and amine value of 35 mgKOH/g |
| Polyester amide C | Adipic acid-diethanolamine condensation product with an acid value of 118 mgKOH/g and amine value of 55 mgKOH/g |
| Polyester amide D | Adipic acid-diethanolamine condensation product with an acid value of 85 mgKOH/g and amine value of 9.8 mgKOH/g |
| Polyester amide E | Adipic acid-diethanolamine condensation product with an acid value of 170 mgKOH/g and amine value of 69 mgKOH/g |
| CMPEI | Polyethylene imine derivative having 80% of substituted alkyl groups (—CH₂COONa) and a MW of 50,000, also described as carboxymethylated polyethylene imine sodium salt |
| AlCl₃•6H₂O | Aluminum chloride hexahydrate |
| AN | Acrylonitrile |
| MAN | Methacrylonitrile |
| MMA | Methyl methacrylate |
| IBX | Isobornyl methacrylate |
| VCl2 | Vinylidene chloride |
| MAA | Methacrylic acid |
| Cross-linking agent A | Trimethylolpropane trimethacrylate |
| Cross-linking agent B | Ethylene glycol dimethacrylate |
| Isobutane | 2-Methyl propane |
| Neopentane | 2,2-Dimethyl propane |
| Isopentane | 2-Methyl butane |
| Isooctane | 2,2,4-Trimethyl pentane |
| Initiator A | 2,2'-Azobis(2,4-dimethyl valeronitrile) |
| Initiator B | Di-2-ethylhexyl peroxy dicarbonate (70% concentration) |

In Examples 1 to 8, the heat-expandable microspheres having a mean particle size ranging from 0.01 to 10 μm were produced constantly with high yield owing to the polyester amide having an acid value from 95 to 140 mgKOH/g used as the dispersion stabilizer. The resultant microspheres exhibited good expansion performance.

In Comparative Example 1, the two polyester amides each having the acid value of 85 and 170 used in the polymerization resulted in inconstant and low-yield production of the heat-expandable microspheres, though the expansion performance of the microspheres was not deteriorated.

In Comparative Example 2, the amount of the two polyester amides each having the acid value of 85 and 170 was increased in polymerization, and the heat-expandable microspheres were produced constantly with high yield, though the expansion performance of the microspheres was deteriorated.

In Comparative Example 3, the absence of the polyester amide caused unstable oil globules of the oily mixture dispersed in the aqueous dispersion medium. Thus, the flocculation and solidification of the components of the reaction mixture were observed and heat-expandable microspheres could not be produced.

In Comparative Example 4, the polyester amide used in polymerization had insufficient solubility in water due to its excessively low acid value, and destabilized the dispersion of the oil globules to cause inconstant and low-yield production of heat-expandable microspheres. In addition, the resultant heat-expandable microspheres had a mean particle size greater than 10 μm.

In Comparative Example 5, the polyester amide used in polymerization had an excessively high acid value and destabilized the dispersion of the oil globules to cause inconstant and low-yield production of heat-expandable microspheres. In addition, the resultant heat-expandable microspheres had a mean particle size greater than 10 μm.

INDUSTRIAL APPLICABILITY

The process of the present invention enables constant and high-yield production of heat-expandable microspheres having a mean particle size ranging from 0.01 to 10 μm without deteriorating their expansion performance.

The heat-expandable microspheres produced in the process of the present invention can be used as a lightweight additive for putties, paints, inks, sealants, mortar, paper clay, ceramic, etc., and also as the additive to matrix resins processed in injection molding, extrusion molding and pressure molding to be made into foamed products having excellent sound insulation, thermal insulation, heat-shielding property, and sound absorbency.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the invention.

The invention claimed is:

1. A process for producing heat-expandable microspheres comprising a thermoplastic resin shell and a blowing agent encapsulated therein, the process comprising dispersing a polymerizable component and the blowing agent in an aqueous dispersion medium containing a polyester amide having an acid value (mgKOH/g) ranging from 95 to 140 and polymerizing the polymerizable component, wherein the heat-expandable microspheres have a mean particle size ranging from 0.01 to 10 μm.

2. The process for producing the heat-expandable microspheres as claimed in claim 1, wherein the polyester amide is obtained from reaction of a carboxylic acid having at least two carboxyl groups and an amino alcohol having at least one amino group and two hydroxyl groups.

3. The process for producing the heat-expandable microspheres as claimed in claim 1, wherein the polyester amide has an amine value (mgKOH/g) ranging from 20 to 60.

4. The process for producing the heat-expandable microspheres as claimed in claim 1, wherein the amount of the polyester amide in the aqueous dispersion medium ranges from 0.0001 to 5 parts by weight to 100 parts by weight of the total of the polymerizable component and blowing agent.

5. The process for producing the heat-expandable microspheres as claimed in claim 1, wherein the carboxylic acid having at least two carboxylic groups is adipic acid, and the amino alcohol having at least one amino group and two hydroxyl groups is diethanolamine.

6. The process for producing the heat-expandable microspheres as claimed in claim 1, wherein the aqueous dispersion medium further contains a particulate metal compound having a mean particle size ranging from 1.0 to 20 nm.

7. The process for producing the heat-expandable microspheres as claimed in claim 6, wherein the particulate metal compound comprises colloidal silica and the pH of the aqueous dispersion medium is 7 or lower.

8. Hollow particles manufactured by thermally expanding the heat-expandable microspheres produced in the process as claimed in claim 1.

9. The hollow particles as claimed in claim 8, further containing fine particles coating an outer surface of the fine particles.

10. A composition containing a base component and the heat-expandable microspheres produced in the process for producing heat expandable microspheres as claimed in claim 1.

11. A formed product manufactured by forming the composition as claimed in claim 10.

12. A composition containing a base component and the hollow particles as claimed in claim 8.

13. A formed product manufactured by forming the composition as claimed in claim 12.

14. A formed product manufactured by forming the composition as claimed in claim 9.

15. A formed product manufactured by forming the composition as claimed in claim 14.

16. The process for producing the heat-expandable microspheres as claimed in claim 1, wherein the polyester amide has an acid value (mgKOH/g) ranging from 96 to 140.

17. The process for producing the heat-expandable microspheres as claimed in claim 1, wherein the polyester amide has an acid value (mgKOH/g) ranging from 99 to 140.

* * * * *